W. A. RIDDELL.
PHOTOGRAPHIC CAMERA.
APPLICATION FILED NOV. 21, 1917.
1,298,791.
Patented Apr. 1, 1919.
4 SHEETS—SHEET 2.
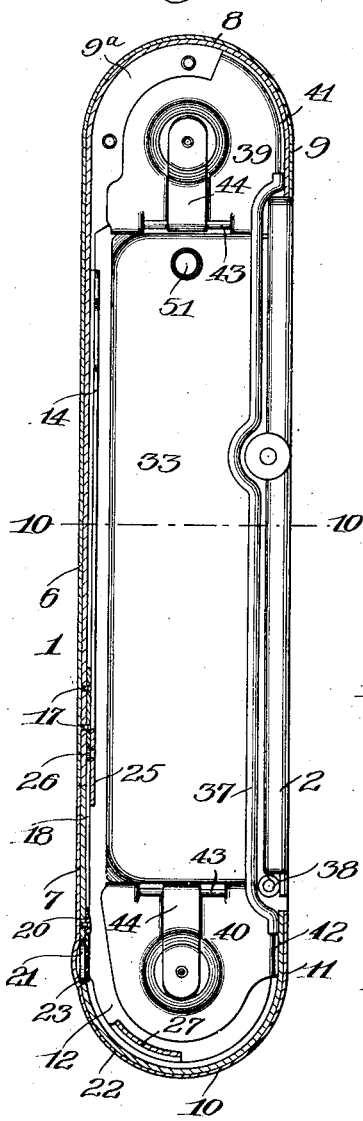
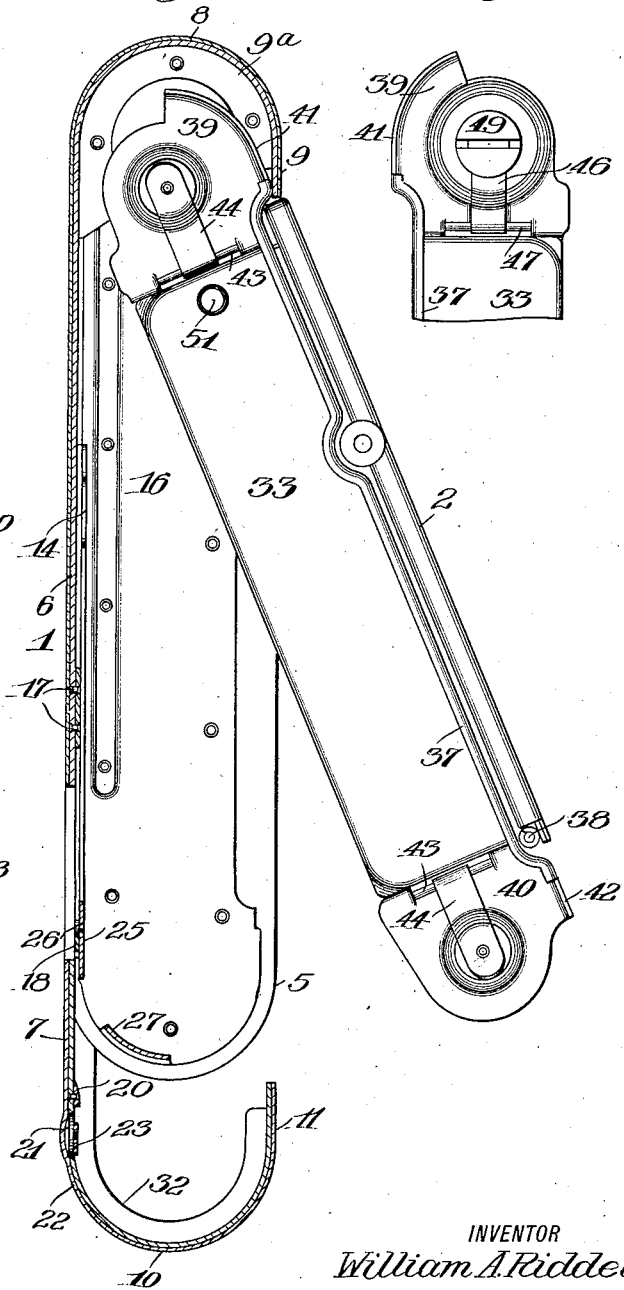
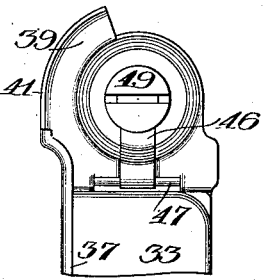
WITNESSES:
Nelson H. Copp
INVENTOR
William A. Riddell
BY
his ATTORNEYS

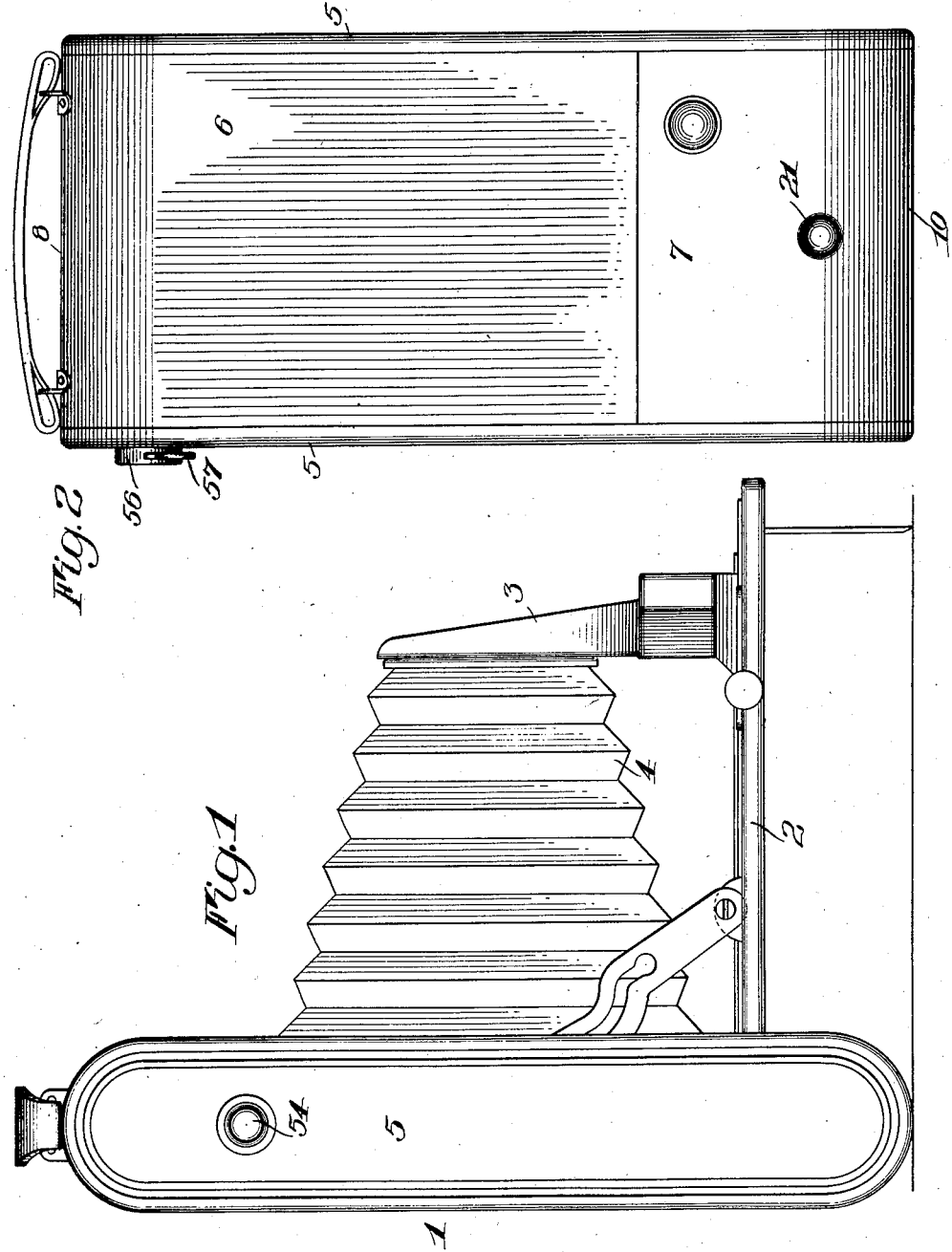

W. A. RIDDELL.
PHOTOGRAPHIC CAMERA.
APPLICATION FILED NOV. 21, 1917.

1,298,791.

Patented Apr. 1, 1919.
4 SHEETS—SHEET 3.

WITNESSES:

INVENTOR
William A. Riddell
BY
his ATTORNEYS

W. A. RIDDELL.
PHOTOGRAPHIC CAMERA.
APPLICATION FILED NOV. 21, 1917.
1,298,791.
Patented Apr. 1, 1919.
4 SHEETS—SHEET 4.
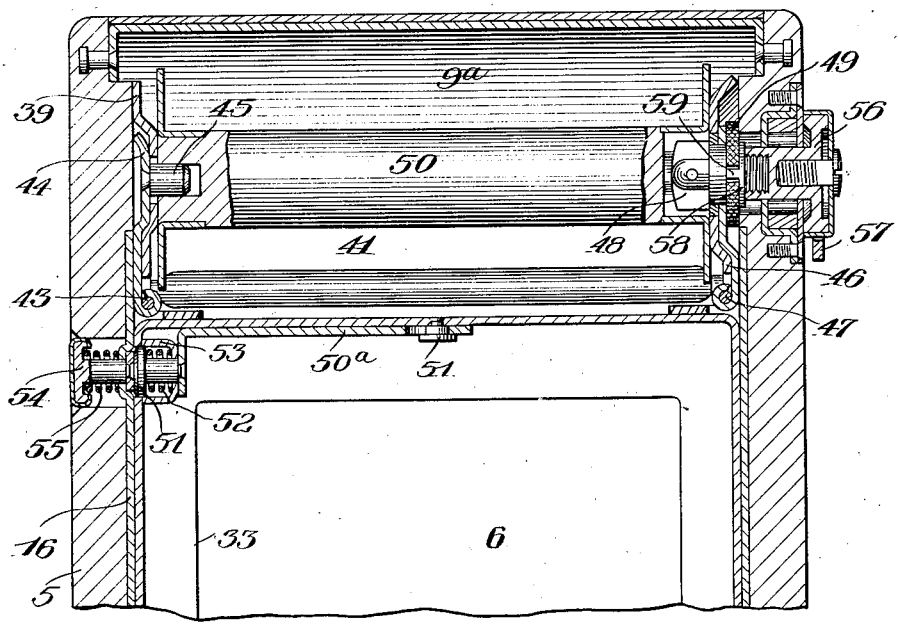
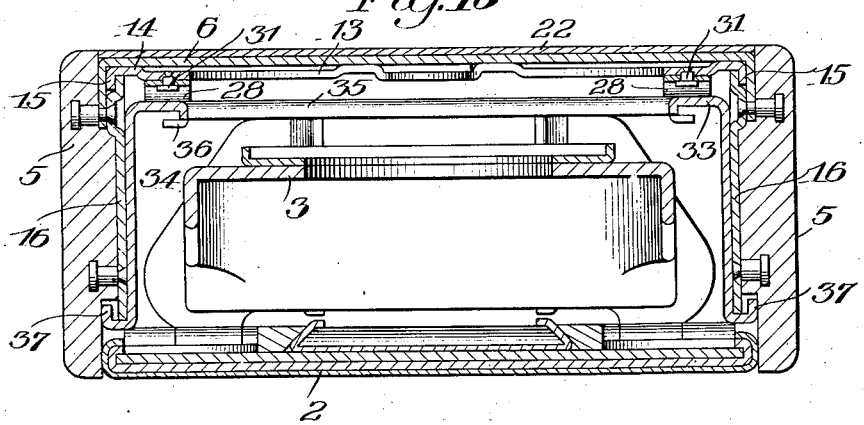
WITNESSES:
INVENTOR
William A. Riddell
BY
his ATTORNEYS

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

1,298,791.  Specification of Letters Patent.  Patented Apr. 1, 1919.

Application filed November 21, 1917. Serial No. 203,201.

*To all whom it may concern:*

Be it known that I, WILLIAM A. RIDDELL, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide a folding film camera of simple construction that will offer certain conveniences in its manipulation particularly with reference to loading and unloading the film spools. The improvements are directed in part toward the means whereby the different elements of the camera are locked in place and released again and further object of the invention is to render the camera effectively light-tight while maintaining its interior easy of access. To these and other ends the invention resides in certain improvements and combinations of parts, all as will be hereinafter more fully described, the novel features being pointed out in the claims at the end of the specification.

In the drawings:

Figure 1 is a side view of a folding camera constructed in accordance with and illustrating one embodiment of my invention, the same being extended for use;

Fig. 2 is a rear view thereof;

Fig. 3 is a section taken substantially in the plane of the inner surface of one of the side walls of the body showing the camera assembled;

Fig. 4 is a similar view showing the manner in which the camera is opened and assembled during loading and unloading;

Fig. 5 is a fragmentary view of one of the spool holding cradles;

Fig. 9 is an enlarged section through one of the film chambers and adjacent parts of the camera, and Fig. 10 is a horizontal section taken substantially on the line 10—10 of Fig. 2.

Similar reference numerals throughout the several views indicate the same parts.

Figure 6:
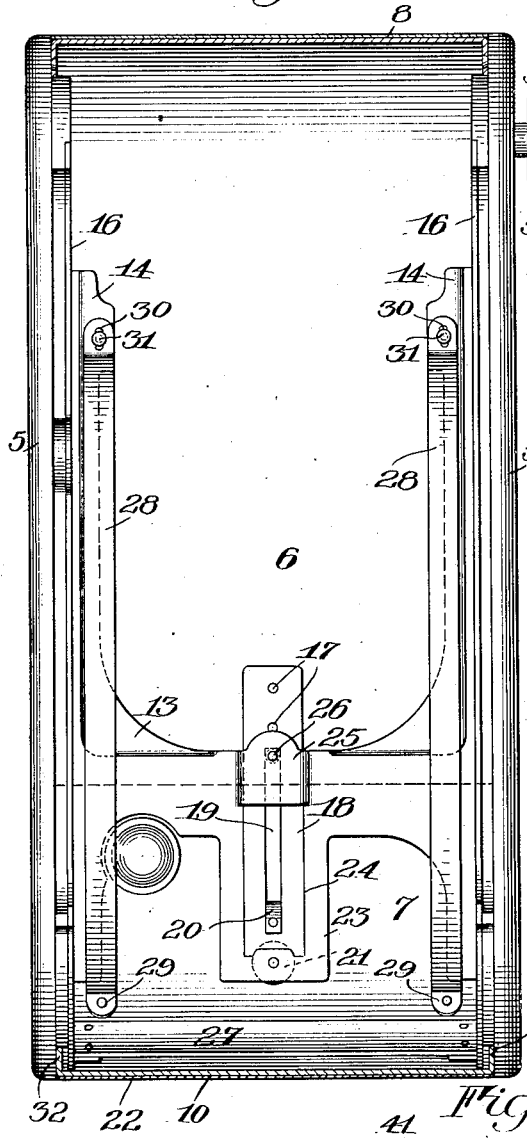
Fig. 6 is a transverse central section through the body looking toward the rear wall of the camera.

So far as the general characteristics of the camera are concerned, it may be of the usual folding or pocket type comprising a body 1 having an opening at the front provided with a door 2 which, when extended, provides a bed as shown in Fig. 1. On this bed operates a front 3 connected to the body by a bellows 4.

In the practice of my invention, I construct the body 1 in such manner that it comprises side walls 5 and a back divided into two parts 6 and 7. The part 6 is preferably of greater extent than the part 7, as shown in Fig. 2, and rigidly connects the side walls 5 at the rear. A curved continuation of it provides an end wall 8 and this end wall is extended forwardly at 9 to form, together with the side walls 5 and the back portion 6, a film roll chamber 9ª. The other back piece 7 is similarly formed with an end portion 10 and a front portion 11 which coöperate with the side walls 5 to form the other film chamber indicated at 12 in Fig. 3. But the back portion 7 and the walls 10 and 11 carried thereby have a sliding relationship to the back portion 6 and the walls 5, 8 and 9ª fixed thereto, so that the former may be drawn out to the position shown in Fig. 4.

For this purpose, a U-shaped plate 13 (Fig. 6), secured to the inner side of the back piece 7, has its arms 14 flanged at 15 to interlock beneath the edge of a lining plate 16 on each side wall 5 of the body as a guide (Fig. 10). On the back piece 6 is secured at 17 a spring tongue 18 having a slot 19 therein while fixed to the back piece 7 is a catch lug 20. When the back pieces 6 and 7 are closed together, as in Figs. 3 and 6, this latch 20 locks in the end of the slot 19 as shown in Fig. 6. To release it, a button 21 on the back piece 7 projecting through to the exterior of the camera, though beneath the usual leather covering 22 thereof, is pressed. This button is carried on and normally held outwardly by a spring tongue 23 on the plate 13 having a slot 24 in which the spring tongue 18 operates. Pressure on the button tongue 18 operates. Pressure on the button deflects both tongues and releases the catch 20 of the slot 19 so that the parts may be drawn apart as in Fig. 4. The two elements are further guided upon each other by an embossed portion 25 on the plate 13 that spans the tongue 18 and has a pin 26 also traveling in the slot 19. The side walls 5 are preferably strengthened in the region of the sliding back piece 7 by a tie piece 27 shown in Figs. 3 and 6. Forwardly bowed spring strips 28 for the familiar purpose of engaging the film and holding it flat, I mount upon the back piece 7, one end of each being riveted to said back piece at 29 and the other end being slotted at 30 to engage a headed pin 31 on the arm 14.

It will thus be seen that the member 7 may be retracted as shown in Fig. 4 by pressing the button 21 and simultaneously pulling outward. When it is thrust back, the latch 20 automatically engages and locks the parts together. At this end of the camera, the side walls 5 are provided with grooves beneath the edges of the lining plates 16 to receive flanges 32 on the wall members 10 and 11 carried by the back piece 7 in a light-tight manner.

Within the camera body, as shown in Figs. 3, 9 and 10, is a bellows frame 33 forming the bellows chamber 34 in which the front 3 is housed when the camera is folded. At the rear of the frame is the exposure opening 35 surrounded by a flange 36 that clamps the rear end of the bellows. The latter is omitted in Fig. 10. The forward edges of the frame are flanged rearwardly at 37 to engage over the front edges of the lining plates 16 and provide a light lock. The bed and door 2 is hinged to this bellows frame 33 at 38 to close the front opening of the body in the usual manner.

Figure 7:
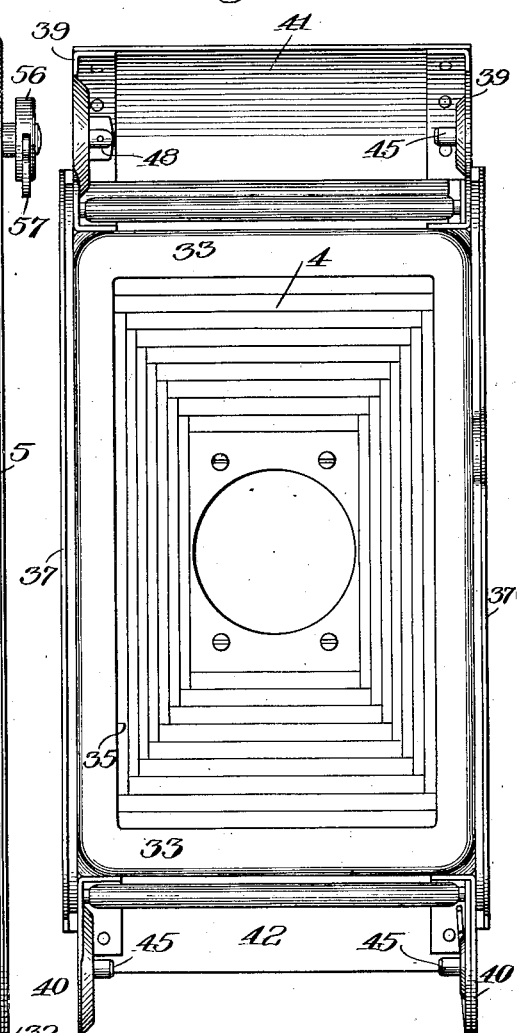
Fig. 7 is a rear view of the detachable element comprising the bellows frame, spool holders and other parts.
Figure 8:
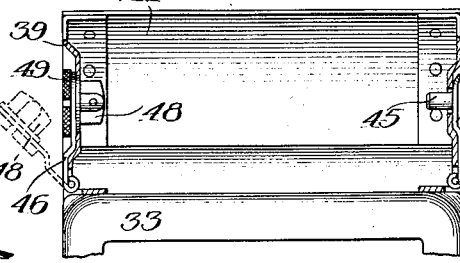
Fig. 8 is a fragmentary rear view of one of the spool cradles.

At the ends of the frame 33 are ears 39 and 40 each pair of which is connected by a plate indicated at 41 and 42 to form cradles for the respective film spools. Pivoted at the bases of three of the ears on pintles 43 are laterally swinging spool centering arms 44 carrying spool centers 45. On the remaining ear is an arm 46 similarly pivoted at 47 but carrying a winding center 48 having a slotted head 49 on the outer side to receive the winding key hereinafter described. When the frame 33 is in place, the side walls 5 of the body prevent the arms 44 from swinging outwardly to release the film spool, as shown in Fig. 9, the spool being indicated at 50. The centers 45 and 48 project through apertures in the ears 39 and 40. The ears 39 occupy the film chamber 9ª and together with the connecting plate 41, engage the wall 9 or interlock thereunder to hold the frame 33 and its connected parts within the body. At the other end the plate 42 connecting the ears 40 is engaged by the forward extension 11 of the end wall 10 and these interlocking arrangements, together with the seating of the forward flanges 37 of the frame against the lining plates 16, hold the camera assembled. To gain access to the film chambers for loading or removing the used spools, the back piece 7 is retracted as in Fig. 4, releasing the lower end of the frame which is rocked outwardly as indicated in that figure and the upper end withdrawn. The spool cradles then become readily accessible, as shown in Fig. 7, and the centers 45 and 48 may be retracted, as indicated in dotted lines in Fig. 8.

The door and bed 2 remains with the frame 33. It is held in closed position thereon by a suitable sliding catch 50ª shown in Fig. 9 as guided on a headed pin 51 on the under side of the upper rail of the frame. The catch terminates in a button 51 on the side face of the frame pressed by a spring 52 within a pocket 53 to hold the latch in engaging position. When the frame 33 is in operative position within the camera, this button 51 comes into alinement with a button 54 in one of the side walls 5 of the body which button is accessible from the exterior of the camera and is held outwardly by a spring 55. Pressing on this button 54 also moves the button 51 inwardly to trip the latch 50ª though by this arrangement, the operating mechanism for the latch does not interfere with the removal and replacement of the frame 33.

On the exterior of one of the walls 5 is a winding key 56 having a folding bail or handle 57. This winding key may also otherwise be of the usual type having provision against back winding and also being movable in and out. The head 58 at its inner end, however, instead of directly engaging the film spool, has a rib 59 that interlocks with the slotted head 49 of the winding center 28. The winding arrangements therefore do not interfere with the removal of the frame 33 and the film spools carried thereby, it being necessary merely to retract the key 56. When the key is in coöperation with the center, however, as in Fig. 9, it assists in locking the frame and camera body together. Therefore, if the camera is held inverted when the back portion 7 is retracted, there is no danger of the frame 33 falling out until the winding key is withdrawn.

In a camera constructed in accordance with my invention, a particularly light tight body is secured while the greatest convenience is offered in gaining access to the film rolls.

I claim as my invention:

1. In a folding camera, the combination with a body having side walls, and an end wall fixed thereto, of a back consisting of a two-part wall, one part of which is fixed to the first mentioned walls and the other part of which is displaceable and carries the other end wall.

2. In a folding camera, the combination with a body having side walls and an end wall fixed thereto, the latter being extended forwardly to form a film chamber, of a back consisting of a two-part wall, one part of which is fixed to the first mentioned walls and the other part of which is displaceable and carries the other end wall, the latter being also extended forwardly to form a film chamber.

3. In a folding camera, the combination with a body having side walls, an end wall fixed thereto, a back consisting of a two-part wall, one part of which is fixed to the first mentioned walls and the other part of which is displaceable and carries the other end wall, of a bellows frame, bellows and front adapted to be inserted in and removed through the front of the body and to be locked in position by the said displaceable element.

4. In a folding camera, the combination with a body having side walls, an end wall fixed thereto, the latter being extended forwardly to form a film chamber, a back consisting of a two-part wall, one of which parts is fixed to the first mentioned walls and the other part of which is displaceable and carries the other end wall, the latter being also extended forwardly to form a film chamber, of a bellows frame, bellows and front adapted to be inserted and removed through the front of the body and to be locked in position by the said displaceable element, the bellows frame constituting the inner walls of the film chambers.

5. In a film camera, the combination with a body having side walls, an end wall fixed thereto, the latter being extended forwardly to form a film chamber, a back consisting of a two-part wall, one of which parts is fixed to the first mentioned walls and the other part of which is displaceable and carries the other end wall, the latter being also extended forwardly to form a film chamber, of a removable and replaceable bellows frame, bellows and front adapted to be interlocked at one end with the fixed end wall of the body during insertion and to be locked by the displaceable end wall at the other end.

6. In a folding camera, the combination with a body open at the front and having side, back and end walls, the latter forming film chambers, of a bellows frame, bellows and front connected together and adapted to be inserted and removed through the front of the body and laterally releasable spool centers at the ends of the bellows frame held in operative position by the walls of the body.

7. In a folding camera, the combination with a body having side, back and end walls, the latter forming film chambers, of a bellows frame, bellows and front adapted to be inserted and removed through the front of the body, said bellows frame constituting the inner walls of the film chambers and being provided with film spool cradles, and axially swinging spool centers at the ends of the bellows frame projecting into the cradles and held in operative position by the walls of the body.

8. In a folding camera, the combination with a body having side, back and end walls, the latter being extended forwardly to form film chambers, of a bellows frame, bellows and front adapted to be inserted and removed through the front of the body and to be interlocked beneath a forward extension of one of the end walls, spool centers carried by the bellows frame and a winding key on the body detachably engaging with one of said centers to lock the bellows frame to the body.

9. In a folding camera, the combination with a body having a two-part back the elements of which are slidable toward and from each other to open and close the camera, of a spring locking tongue on one of said elements, a catch on the other coöperating with said tongue, a button accessible from the exterior for releasing the spring tongue and a spring plate on the catch carrying element for returning the button and formed to coöperate with the spring tongue as a guide for said last mentioned element.

WILLIAM A. RIDDELL.

Witnesses:
 HELEN M. FRASER,
 MARGARET DUIGNAN.